United States Patent [19]

Steinleitner et al.

[11] 4,413,043

[45] Nov. 1, 1983

[54] ELECTROCHEMICAL STORAGE CELL

[75] Inventors: Günther Steinleitner, Schriesheim; Wilhelm Haar, Sandhausen, both of Fed. Rep. of Germany

[73] Assignee: Brown, Boveri & Cie AG, Mannheim-Kafertal, Fed. Rep. of Germany

[21] Appl. No.: 293,886

[22] Filed: Aug. 18, 1981

[30] Foreign Application Priority Data

Sep. 3, 1980 [DE] Fed. Rep. of Germany ....... 3033130

[51] Int. Cl.³ ..................... H01M 4/36; H01M 4/48; H01M 6/20
[52] U.S. Cl. ..................................... 429/104; 429/193
[58] Field of Search ............... 429/171, 174, 185, 184, 429/163, 164, 165, 166, 167, 104, 193, 191, 181

[56] References Cited

U.S. PATENT DOCUMENTS 4,168,351 9/1979 Taylor ................. 429/174
4,291,107 9/1981 Barry et al. ............ 429/104
4,341,849 8/1982 Park et al. ............ 429/104

FOREIGN PATENT DOCUMENTS 2056753 3/1981 United Kingdom ........... 429/181

*Primary Examiner*—Donald L. Walton
*Assistant Examiner*—Stephen J. Kalafut
*Attorney, Agent, or Firm*—Herbert L. Lerner; Laurence A. Greenberg

[57] ABSTRACT

Electrochemical chemical storage cell or battery of the alkali metal and chalcogen type with an anode space and a cathode separated from each other by an alkali-ion conducting solid electrolyte. The cup-shaped solid electrolyte of beta-aluminum oxide is fastened at its open end in a force-locking manner by means of a joining material to an annular insulating body. The joining material contains a mixture of a glass powder and a ceramic powder suspended in a liquid with high viscosity.

10 Claims, 1 Drawing Figure

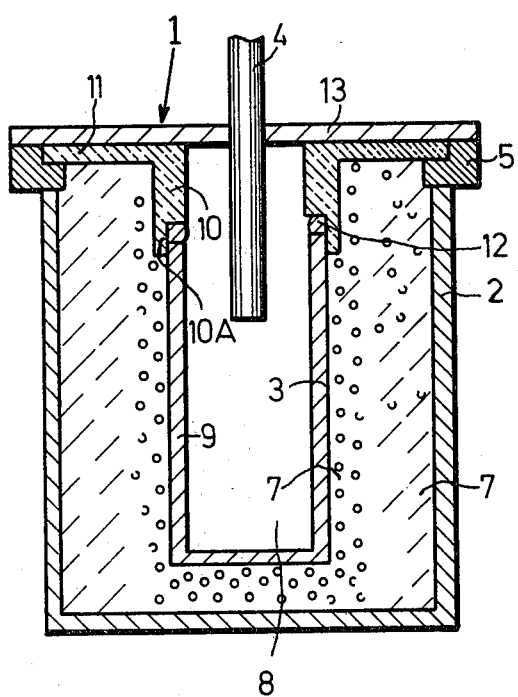

ELECTROCHEMICAL STORAGE CELL

BACKGROUND OF THE INVENTION

1. Field of the Invention

The invention relates to an electrochemical storage cell or battery of the alkali metal and chalcogen type with at least one anode space for receiving the anolyte, and a cathode space for receiving the catholyte. The spaces are separated from each other by an alkali ion-conducting solid electrolyte. The cup-shaped solid electrolyte is made of beta-aluminum oxide and connected at its open end to at least one annular insulating body.

2. Description of the Prior Art

An electrochemical storage cell on the basis of alkali metal and sulfur which has two anode spaces and one cathode space is known from the German Published Non-Prosecuted Application DE-OS No. 2811169. The cathode space is separated from the two anode spaces by respective cylindrical ion-conducting solid-electrolyte walls. The cathode space formed by the two cylindrical solid-electrolyte walls is closed-off on the other side by an insulating ceramic disc. A tubular insulating body is placed on the upper ends of the two cylindrical solid-electrolyte walls. The two cylindrical solid-electrolyte walls are made of beta-aluminum oxide. The two tubular insulating bodies are made of alpha-aluminum oxide; thereby, the cathode space which is contained between the two cylindrical solid electrolyte walls of beta-aluminum oxide, is completely insulated from the anode spaces located on both sides thereof. The two tubular insulating bodies made of alpha-aluminum oxide are fitted to the diameters of the two cylindrical solid-electrolyte walls and are connected thereto via an intermediate glass.

U.S. Pat. No. 4,048,391 shows an electrochemical storage cell on the basis of sodium and sulfur which has an anode and a cathode space. The solid electrolyte is designed as a tube closed-off on one side. The solid electrolyte is likewise made of beta-aluminum oxide. It is connected at its open end to an annular insulating body which serves as a flange and is made of alpha-aluminum oxide.

The main problem in connecting such solid electrolytes made of beta-aluminum oxide to insulating bodies is that most glasses, especially such which contain heavy metal ions or also silicon oxide are corroded relatively severely by the alkali metal. This greatly reduces the electrical insulation of the cathode space from the anode space. In addition, the tightness of the reactant spaces which are closed from each other and toward the outside, is reduced considerably, which shortens the service life of the storage cell.

SUMMARY OF THE INVENTION

It is therefore an object of the invention to provide a long-life joint between the solid electrolyte and the insulating body which is resistant to corrosive effects of alkali metal and alkali-metal polysulfide.

With the foregoing and other objects in view, there is provided in accordance with the invention an electrochemical storage cell or battery of the alkali metal and chalcogen type with at least one anode space for the alakali metal anolyte and a cathode space for the chalcogen catholyte, with the cathode space and the anode space separated from each other by an alkali ion-conducting solid electrolyte in the form of a cup-shaped solid electrolyte connected at its top open end to an annular insulating body, the combination therewith wherein the annular insulating body is fastened in a force-locking manner by means of a joining material to the open end of the cup-shaped solid electrolyte, the forming material containing a mixture of a glass powder and a ceramic powder suspended in a liquid with high viscosity.

Other features which are considered as characteristic for the invention are set forth in the appended claims.

Although the invention is illustrated and described herein as embodied in electrochemical storage cell, it is nevertheless not intended to be limited to the details shown, since various modiications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing in which is diagrammatically illustrated a storage cell in accordance with the invention with an outer cup-shaped body of metal, an interior cup-shaped solid electrolyte, and a current collector extending into the anode space bounded by the latter. The open end of the cup-shaped electrolyte is connected to an annular or ring-shaped body which forms a flange by means of an annular recess into which the rim of the open end of the electrolyte is inserted. The electrolyte and annular body are joined by means of a mixture of glass powder and ceramic powder suspended in a liquid with high viscosity, such as glycerin.

DETAILED DESCRIPTION OF THE INVENTION

The annular insulating body is fastened in a force-locking manner via a hardened connecting material to the solid electrolyte. The connecting material is a mixture of a glass powder and a ceramic powder, suspended in a liquid with a high viscosity. In the preparation, the mixture is suspended in glycerin.

Preferably, alpha-aluminum oxide powder is added to glass powder to form the powder mixture. The joining material, powder basis, contains 60% by weight glass powder and 40% by weight alpha-aluminum oxide. 80% by weight glass powder and 20% by weight alpha-aluminum oxide can also be used in the preparation of a joining material. However, a mixture with 45 to 70% by weight glass powder is preferably used for joining material, where the share of alpha-aluminum oxide powder is then between 55 and 30% by weight. The grain size of the alpha-aluminum powder is between 10 and 100 $\mu$m. Preferably, a grain size of 20 to 60 $\mu$m is chosen. The glass powder contained in the joining material is preferably composed of about 70% by weight $SiO_2$, 15% by weight $B_2O_3$, 10% by weight $Na_2O$ and 5% by weight $Al_2O_3$. A glass that comprises 50% by weight $B_2O_3$, 40% by weight $BaO$ and 10% by weight $Al_2O_3$ can also be used.

Advantageously, the coefficient of thermal expansion of the joining material deviates at most 10 to 20% from the coefficient of expansion of the solid electrolyte and the insulating body. The corrosion resistance which the joint according to the invention between the solid electrolyte and the insulating body exhibits, achieved by enrichment of the glass with aluminum oxide is a transition layer between the glass and the alpha-aluminum oxide.

The annular insulating body has a ring-shaped recess on the side facing the beta-aluminum oxide electrolyte tube, into which recess the upward-pointing rim of the tube is inserted. The ring-shaped recess is arranged so that the insulating body extends outward beyond the solid electrolyte and forms a flange by means of which the solid electrolyte is placed on the inward-pointing flange of a cup-shaped metallic body. The annular insulating body is preferably made of alpha-aluminum oxide with a content of at least 95by weight aluminum oxide. Corrosion tests were performed to test the corrosion resistance of the joining material according to the invention. For this purpose, several beta-aluminum oxide tubes which were joined to an insulating body each in the conventional manner via glass solder, and beta-aluminum oxide tubes which were joined to an insulating body via the joining material according to the invention, were subjected to the influence of liquid sodium at 400° C. After a test time of about 500 hours, distinct differences between the beta-aluminum oxide tubes to which insulating bodies were fastened via pure joining glass and the solid electrolytes according to the invention were observed. In particular, the joining glass of the solid electrolytes made conventionally showed a brown-black scaly structure, the thickness of the corrosion layer formed being more than 100 $\mu$m. The joining material according to the invention of the other solid electrolytes showed a medium brown-colored, smooth structure. The thickness of the corrosion layer of the joining material according to the invention was less than 20 $\mu$m. In addition to the corrosion property of the material according to the invention, the leakage rate of the sample elements, especially in the region of the joint between the solid electrolyte and the insulating body, was checked. For this purpose, all sample bodies were exposed to a helium gas at the beginning of the test. All test bodies showed a leakage rate at the beginning of the test, which was smaller than $10^{-10}$ (mbar . 1 . s$^{-1}$). At the end of the above described corrosion tests within the liquid sodium, the solid electrolytes which had been joined to the insulating bodies via the connecting glass used heretofore, showed in the region of the joint leakage rate which was higher than $10^{-4}$ (mbar . 1 . s$^{-1}$). In contrast thereto, the solid electrolytes which were joined via the connecting material according to the invention, showed in the region of the joints a leakage rate still much smaller than $10^{-10}$ (mbar . 1 . s$^{-1}$).

The invention will be explained in the following with the aid of the accompanying drawing. The figure shows a storage cell generally designated with a cup-shaped body 2 metal, a solid electrolyte 3 and a current collector 4. The cup-shaped body 2 of metal is a tube closed on one side and made, for instance, of thin-walled aluminum or V4A steel. At its upper end, the cup-shaped body 2 is provided with a flange 5 which points inward as well as outward. The cup-shaped solid electrolyte 3 is arranged in the interior of the cup-shaped body 2. The dimensions of the solid electrolyte 3 are chosen so that a minimum spacing of several millimeters exists between its outer boundary surfaces and the inner boundary surfaces of the cup-shaped body 2 on all sides and thereby, a coherent interspace 7 is formed which, in this embodiment, serves as the cathode space. The interior of the solid electrolyte takes on the function of the anode space 8, into which the alkali metal, particularly the sodium used here, is filled. The amount of the sodium filled into the solid electrolyte 3 is chosen large enough so that the boundary surfaces of the solid electrolyte 3 are wetted by the sodium and also until the maximum final charging voltage is reached. A current collector 4 which extends by a few millimeters beyond the storage cell 1 on the outside, projects into the interior of the solid electrolyte 3. The metallic body 2 serves as the second current collector of the storage cell.

As mentioned above, the solid electrolyte 3 is likewise designed in the shape of a cup. It is formed by a tube 9 which is closed on one side and is made of beta-aluminum oxide. The open end of this tube 9 is connected to a ring-shaped insulating body 10. As shown in the drawing, the insulating body 10 may be provided with an annular recess 10A, into which the upper rim of the tube 9 can be inserted. The recess 10A is arranged at the insulating body 10 in such a manner that the latter, after being joined to tube 9, extends outward and forms the flange 11 of the solid electrolyte 3. The inside diameter of the annular insulating body 10 is fitted to the inside diameter of the solid electrolyte 3. The flange 11 is placed on flange 5 of the cup-shaped body 2 and closes off the interspace 7 which serves as the cathode space. The annular insulating body 10 is made in the embodiment example shown here of alpha-aluminum oxide, the aluminum oxide content being more than 95%. The joining material 12 in accordance with the invention is used for joining the tube 9 to the annular insulating body 10. The latter is prepared from a mixture of glass powder and ceramic powder. An alpha-aluminum oxide powder is particularly well suited as the ceramic powder. Preferably, a ceramic powder with a grain size of between 10 and 100 $\mu$m is used. In the embodiment example shown here, the grain size of the alpha-aluminum oxide is 20 to 60 $\mu$m. The glass powder contained in the mixture is composed of 70% by weight $SiO_2$, 15% by weight $B_2O_3$, 10% by weight $Na_2O$ and 5% by weight $Al_2O_3$.

Alternatively a glass powder can also be used which is composed of 50% by weight $B_2O_3$, 40% by weight BaO, 10% by weight $Al_2O_3$. To prepare the solid electrolyte 3, especially for joining the tube 9 to the annular insulating body 10, the two components (in powder form) of the joining material specifically the glass powder and the alpha-aluminum oxide powder are suspended in a liquid with high viscosity. A liquid particularly well suited for this purpose is glycerin. After the suspension is completed, either the open end of the tube 9 or the end of the annular insulating body 10 to be joined to the tube 9 is immersed in this liquid mixture.

Subsequently, the open end of the tube 9 is inserted into the recess 10A of the insulating body 10. The liquid of the joining material, particularly the glycerin, is expelled by heating, preferably under vacuum, at a temperature suited for this purpose. Subsequently, the joining material is completely hardened by heating it to the processing temperature so that a force-locking joint between the tube 9 and the annular body 10 is formed which has the mechanical strength required of the solid electrolyte. The anode space is completely insulated by the insulating body 10 from the cathode space. The opening of the solid electrolyte 3 is closed off by a plate 13 which is likewise made from non-conducting, corrosion-resistant material. The plate 13 rests with its outer rim on the flange 5 of the cup-shaped body 2 and is connected to the latter in a force-locking manner. Thereby, the storage cell 1 is closed off tightly to the outside. The current collector 4 extending into the solid electrode 3 is brought through the plate 13 and is held there. As already mentioned, the interior of the solid electrolyte 3 serves in the embodiment shown here as the anode space 8 which is filled with sodium. The interspace 7 forms the cathode space and is filled with sulfur. Additionally, ion- and electron-conducting layers may be arranged in the cathode space 7 to increase the rechargeability of the storage cell.

The embodiment of the solid electrolyte 3 described here can also be used if the interior of the solid electrolyte 3 is used as cathode space and the interspace 7 as the anode space.

There are claimed:

1. Electrochemical storage cell or battery of the alkali metal and chalcogen type with at least one anode space for the alkali metal anolyte and a cathode space for the chalcogen catholyte, with the cathode space and the anode space separated from each other by an alkali ion-conducting solid electrolyte in the form of a cup-shaped solid electrolyte connected at its top open end to an annular insulating body, the combination therewith wherein the annular insulating body containing alpha-aluminum oxide is fastened by means of a joining material to the open end of the cup-shaped solid electrolyte of beta-aluminum oxide, said joining material containing a mixture of a glass powder and a ceramic powder, said glass powder contained in the joining material having a composition of about 50% by weight $B_2O_3$, about 40% by weight of BaO, and about 10% by weight of $Al_2O_3$, said ceramic powder is an alpha-aluminum oxide powder, said joining material applied as a suspension in glycerin, said glycerin being expelled from the suspension after said suspension is applied.

2. Storage cell according to claim 1, wherein the joining material contains about 80% by weight glass powder and about 20% by weight ceramic powder.

3. Storage cell according to claim 1, wherein the joining material, powder basis, contains about 60% by weight glass powder and about 40% by weight ceramic powder.

4. Storage cell according to claim 1, wherein the joining material, powder basis, contains about 45% by weight glass powder and about 55% by weight ceramic powder.

5. Storage cell according to claim 1, wherein the joining material, powder basis, is about 70% by weight glass powder and about 30% by weight ceramic powder.

6. Storage cell according to claim 1 or claim 2 or claim 3 or claim 4 or claim 5, wherein the alpha-aluminum oxide powder has a grain size of 10 to 100 μm.

7. Storage cell according to claim 1 or claim 2 or claim 3 or claim 4 or claim 5, wherein the alpha-aluminum oxide powder has a grain size of 20 to 60 μm.

8. Storage cell according to claim 1, wherein the annular insulating body is provided with a ring-shaped recess, into which is inserted the rim of the top open end of the cup-shaped solid electrolyte.

9. Storage cell according to claim 8, wherein the annular insulating body forms an outward-pointing flange.

10. Storage cell according to claim 8, wherein the annular insulating body is made of alpha-aluminum oxide with a content of at least 95% by weight aluminum oxide.

* * * * *